April 25, 1933.　　　　V. K. BOYNTON　　　　1,905,211
PROCESS AND APPARATUS FOR MAKING COMPOSITE
GLASS OR OTHER COMPOSITE ARTICLES
Filed June 25, 1928　　　　5 Sheets-Sheet 2
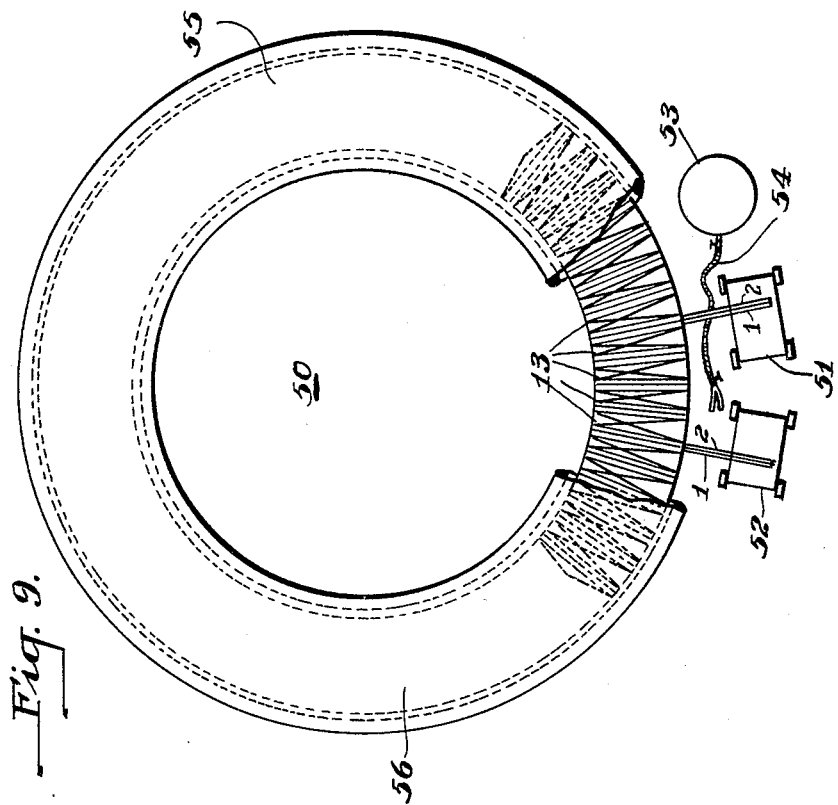
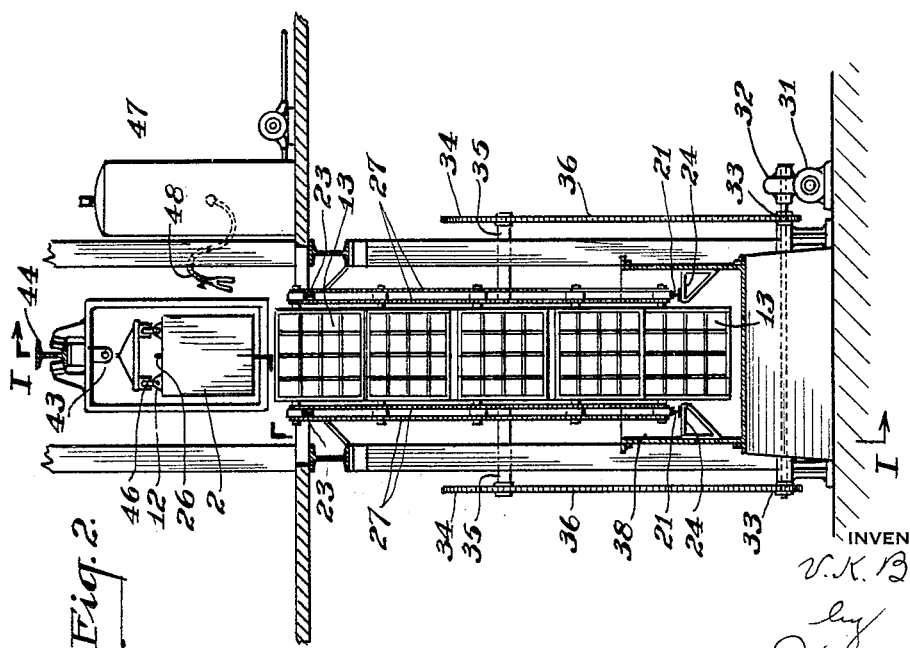
INVENTOR
V. K. Boynton
by
James L. Bradley
Atty

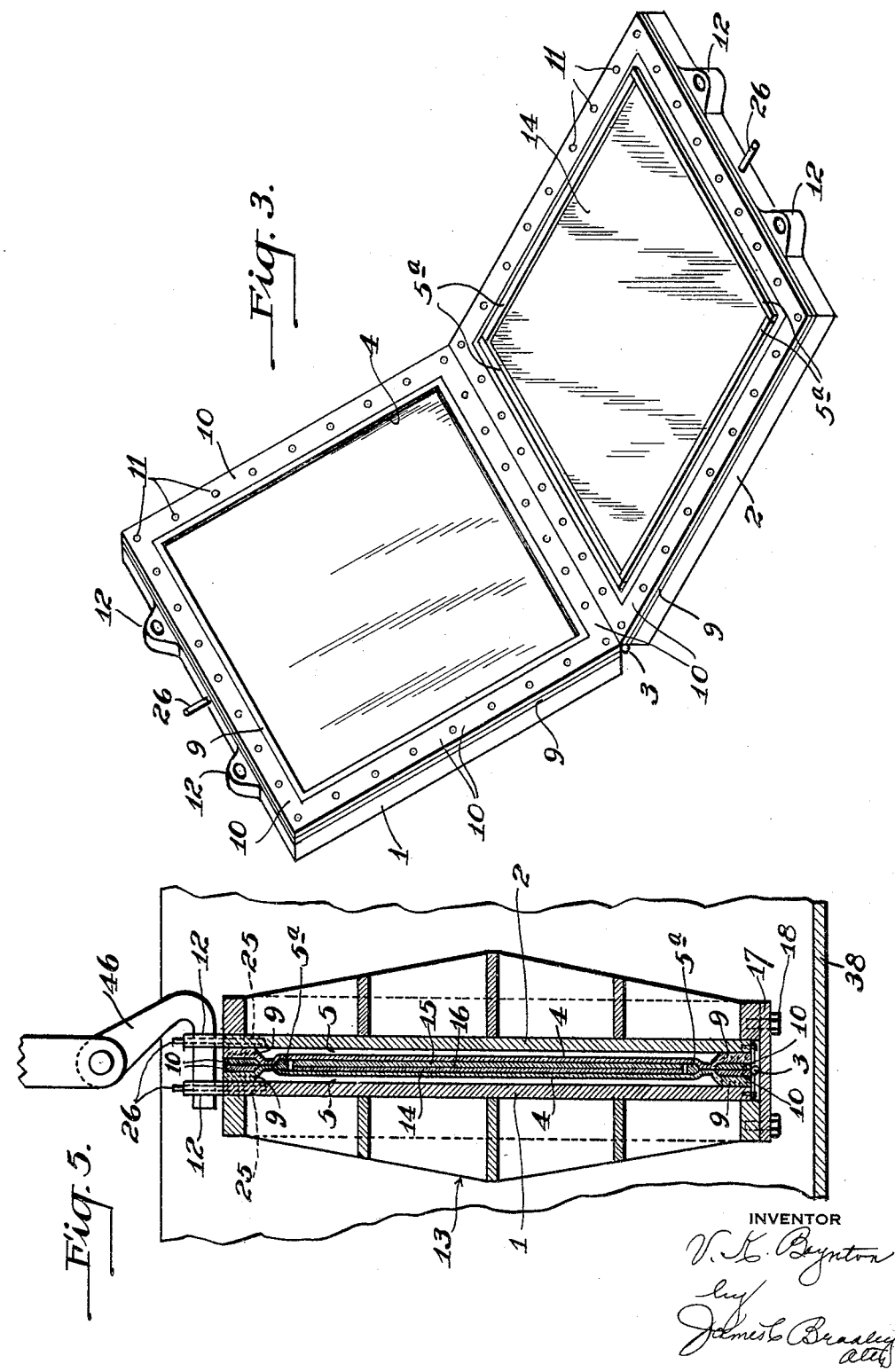

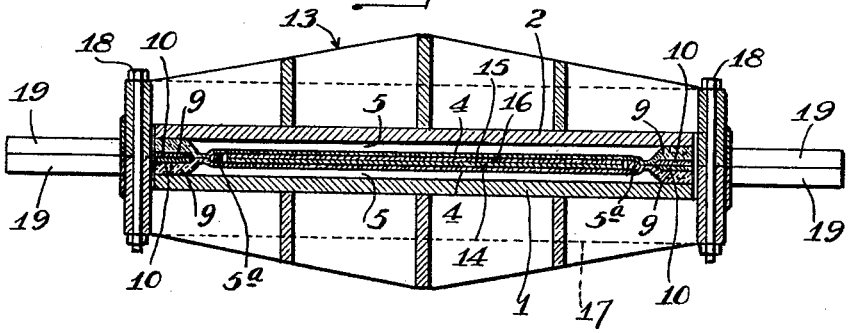
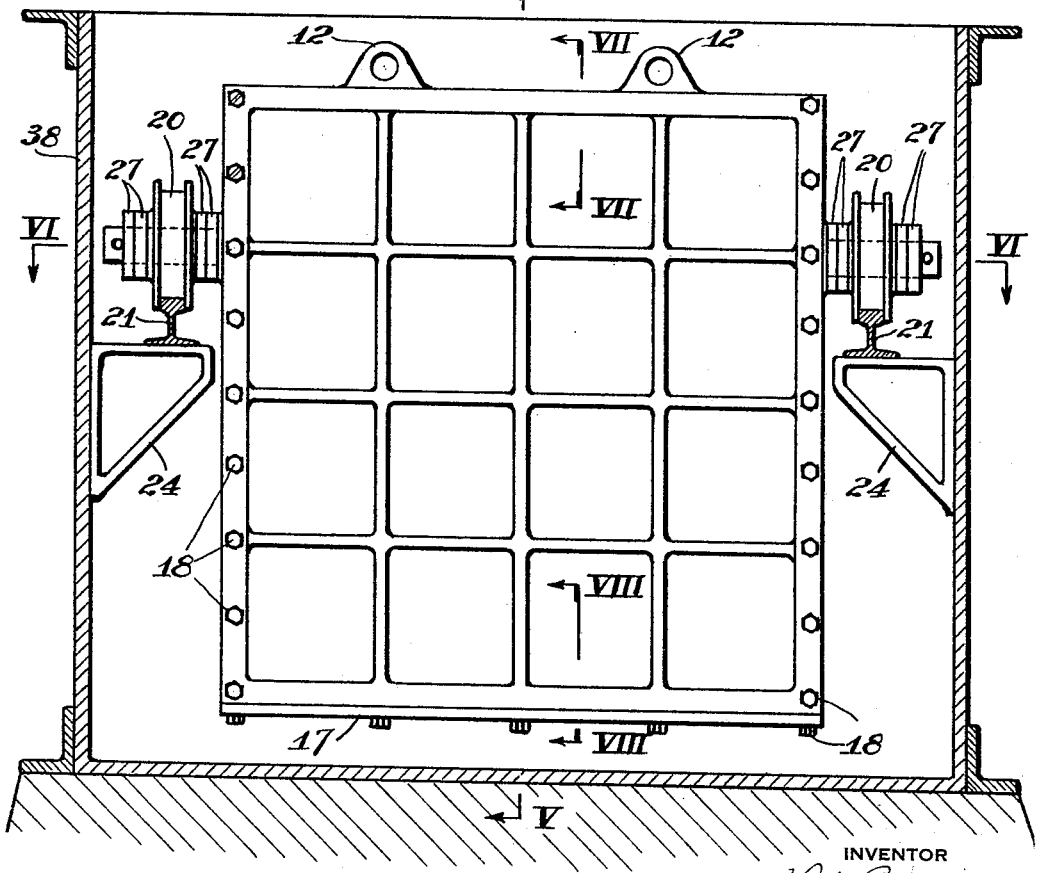

Patented Apr. 25, 1933

1,905,211

UNITED STATES PATENT OFFICE

VERN K. BOYNTON, OF MILWAUKEE, WISCONSIN, ASSIGNOR TO DUPLATE CORPORATION, A CORPORATION OF DELAWARE

PROCESS AND APPARATUS FOR MAKING COMPOSITE GLASS OR OTHER COMPOSITE ARTICLES

Application filed June 25, 1928. Serial No. 288,126.

Figure 1:
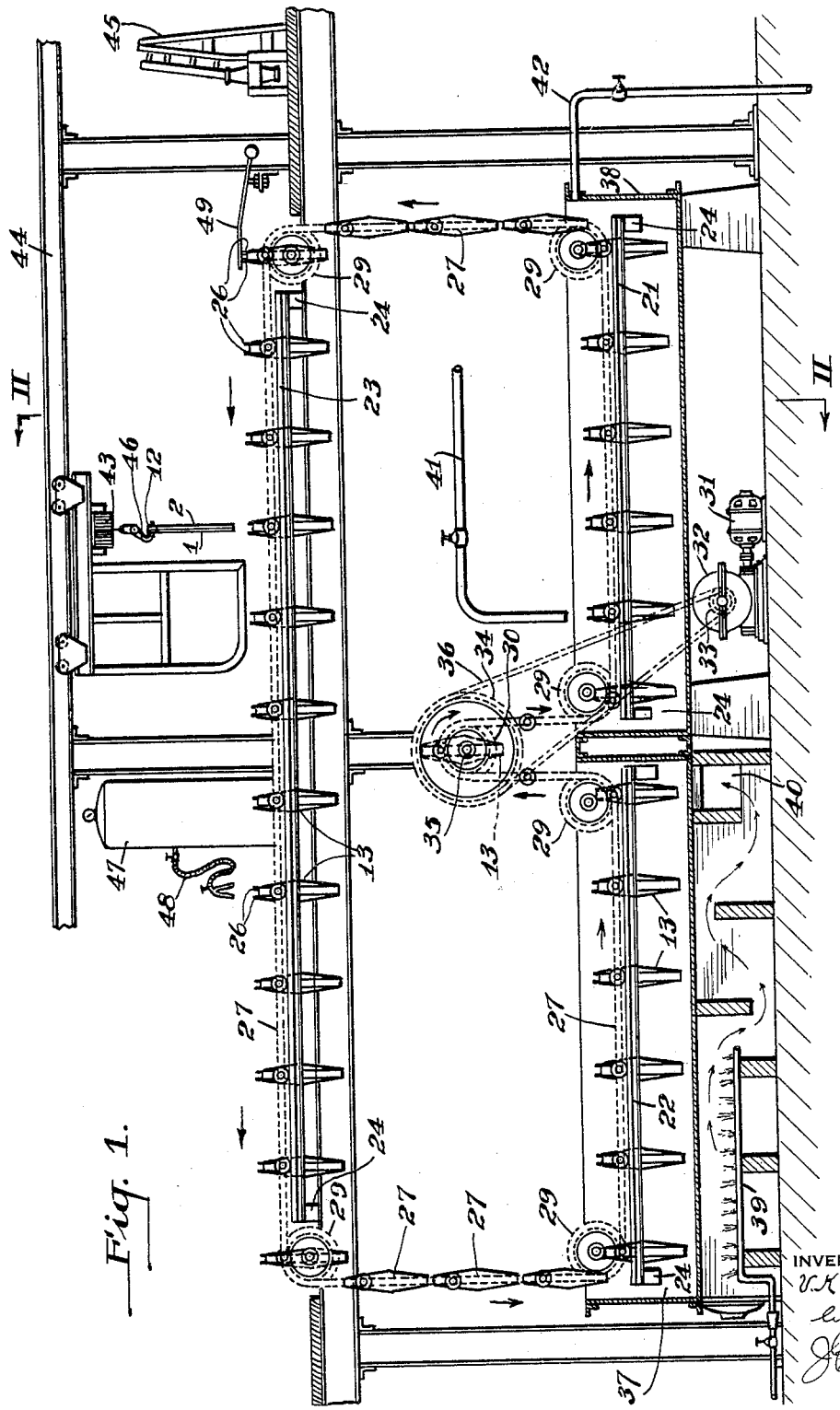

The invention relates to a process and apparatus for making composite glass or other composite articles, wherein heat and pressure are applied to cause a joinder between the members to be joined together, such as the glass and the pyralin or celluloid which is used as reinforcing. Composite glass ordinarily comprises two sheets of glass with a sheet of pyralin, celluloid, or other equivalent material cemented therebetween, although a greater number of sheets may be employed. It is the practice to assemble the sheets with a coating of cement, such as gelatin, dried upon the surfaces of the glass sheets which are to be cemented to the pyralin, the heat subsequently applied serving to soften the gelatin and secure adhesion when pressure is applied. The present invention has for its principal objects; the provision of an improved process and apparatus for accomplishing the necessary heating and pressing; the provision of a process and apparatus whereby quantity production may be secured with a minimum of labor; and the provision of a process and apparatus wherein the time required for carrying out the process, as compared with those heretofore employed for doing equivalent work, is reduced. Certain embodiments of the invention are illustrated in the accompanying drawings, wherein:

Figure 1 is a section on the line I—I of Fig. 2 showing the general arrangement of one form of apparatus. Fig. 2 is a section on the line II—II of Fig. 1. Fig. 3 is a perspective view of one of the containers employed in open position. Fig. 4 is an enlarged partial section also on the line II—II of Fig. 1. Figs. 5, 6, 7 and 8 are sections on the lines V—V, VI—VI, VII—VII, and VIII—VIII, respectively of Fig. 4. And Fig. 9 is a diagrammatic plan view showing a modified general arrangement.

Briefly stated, the process in its preferred form contemplates moving through a heated area a container, in which are placed the members to be joined together and a body of liquid. The passage of the container through the heated area heats the liquid, which in turn heats the members to be joined to the necessary degree. The heating of the liquid also develops a pressure in the liquid which is transmitted to the members so that the passage of the container through the heated area develops both the temperature and pressure therein necessary to join the members together. The container is subsequently passed through a cooled area in order to quickly cool down the container and its contents. The heated and cooled areas referred to may be in the form of bodies of liquid or in the form of elongated chambers which are heated and cooled in any suitable manner. The containers are preferably carried, in an endless series, past stations at which the operators first load the containers and then remove the composite members therefrom after the operation is complete. The liquid may, if desired, be applied to the containers under a pressure which approximates that required for carrying out the operation, and the passage through the heated area employed merely to give the necessary temperature; or the liquid may be applied to the containers at a pressure somewhat below that required for carrying out the operation, and the expansion of the liquid under the increased temperature, depended upon to bring the pressure up to the final requirement. In any case, suitable relief valve means are preferably employed to prevent the pressure in the containers from rising above a predetermined point. A liquid filler for the containers has been referred to, but, if desired, a gas may be employed or the containers may be filled only partly with liquid, and the vapor pressure which is developed from the liquid relied upon to give the necessary pressure. The pressure and temperature used will depend on conditions. Ordinarily, the pressure employed is about 150 pounds per square inch and the temperature about 250 degrees F.

Figure 7:
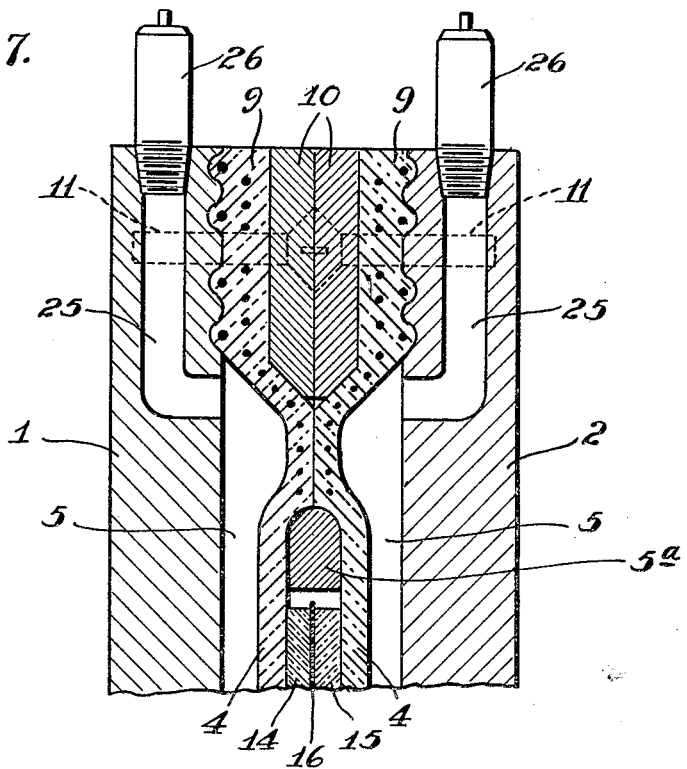
Figure 8:
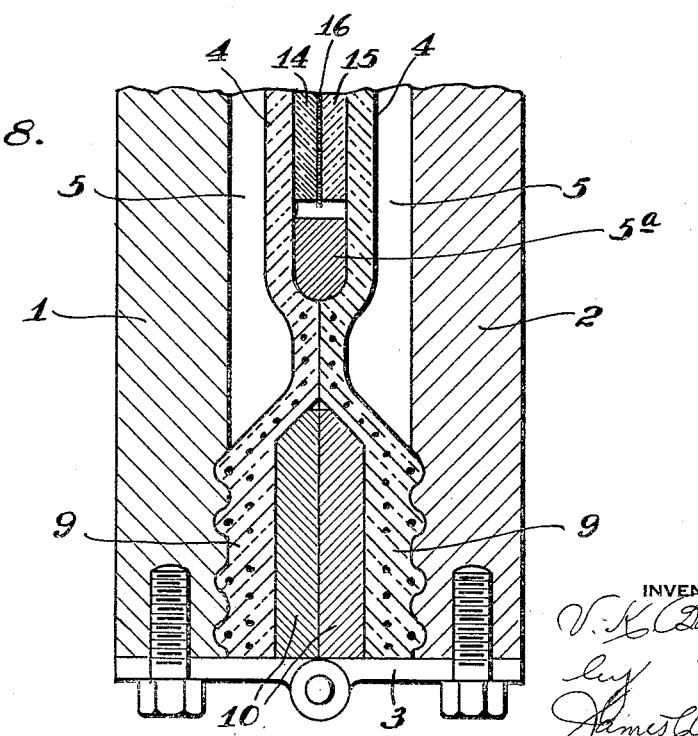

One of the containers is illustrated in Figs. 5 to 8. It comprises a pair of trays 1 and 2 secured together at their edges by the hinge 3. Each tray has a diaphragm 4 closing the open side of the tray, thus providing the chambers 5, 5 for the application of pressure as later described. The diaphragms have their edges reinforced and corrugated as indicated at 9 in Figs. 7 and 8 to correspond with similar corrugations in the edges of the trays. The spacing strips 5a are employed around the edges of the sheets in order to prevent too great pressure being applied to the edges of the sheets and so unduly thinning the pyralin at its edges and squeezing it out. The metal binding strip 10 clamps the edges of the diaphragms against the trays, screws 11 being employed for this purpose (Fig. 7). The edges of the trays are provided with the perforated brackets 12 for handling them, as later described. The sheets to be joined together are placed in assembled relation on the diaphragm of the lower tray when such tray is opened as indicated in Fig. 3, after which the upper tray is closed down on the upper one and the device is placed in the skeleton supporting frame 13 as later described. The set of sheets thus assembled comprises the glass sheets 14 and 15 having on their inner faces thin coatings of dried cement, such as gelatin, and a sheet 16 of cellulose plastic, such as pyralin.

Since the pressure to be applied in the chambers 5 would spring or distort the trays, the trays are supported during the pressing operation in the frame 13. These frames are preferably steel castings of skeleton form, the frame being in two parts secured together by the plate 17 (Figs. 4 and 5) and by the bolts 18 (Figs. 4 and 6). A slot is thus provided between the two halves of the frame, open at the upper side of the frame (Fig. 5) and adapted to receive the container made up of the trays 1 and 2 when they are closed. Each half of the frame is provided with two half trunnions 19, 19 on which are mounted the wheels 20, 20 adapted to ride on the rails 21, 22 and 23, such rails being supported on suitable brackets 24. Fluid under pressure is applied to the chambers 5, 5 by means of the passages 25, 25 (Fig. 7) to which are connected the casings 26, 26 provided with suitable check relief valves arranged to open when the pressure in the chambers 5, 5 rises above a point for which the valves are set. In operation, a large number of the frames 13 are linked together by a chain made up of the pairs of parallel bars 27, 27 pivoted to the trunnions 19, 19 as indicated in Figs. 1 and 4.

As indicated in Fig. 1, the endless chain made up of the bars 27 with the wheels 20 at their ends, pass around the six pairs of idler sprockets 29, 29 and around the pair of driven sprockets 30, 30, the latter being driven from the motor 31 through the intermediary of worm gearing in the casing 32, a pair of sprockets 33 on the worm wheel shaft, a sprocket 34 on the shaft 35 of the sprockets 30 and the sprocket chain 36. The rails 21 and 22 which support the chain during the lower portion of its travel are carried by the inner sides of the tanks 37 and 38 so that the frames 13 are submerged in the liquid in these tanks during this portion of their travel. The tank 37 contains a heating liquid, such as oil, which is heated to a temperature of 250 degrees F. or upward, while the tank 38 contains a cooling liquid such as water. The tank 37 is heated by means of the burner 39, the gases of combustion following the path indicated by the arrows and discharging to the stack 40. The tank 38 is preferably kept at the desired temperature by a circulation of water therethrough, 41 being the inlet pipe and 42 the outlet pipe. A crane 43 mounted on the track 44 serves to remove the containers from the frames 13 and carry them to the rack 45, the crane being provided with hooks 46 which engage the perforations in the brackets 12, as indicated in Fig. 5. When one container is removed, a new one is put into the frame to take its place, such new container having assembled therein the sheets to be joined together. The same crane is used to bring the new containers to a position over the frames 13 and lower them into such frames.

The liquid is supplied to the chambers 5, 5 of the containers from the tank 47 in which the liquid to be used is kept at any desired pressure. A flexible pipe 48 leading from the tank is provided with a pair of connections adapted to engage the casings 26, 26 (Fig. 7). After the frames 13 have passed upward from the cooling tank 38, the valves in the casings 26, 26 are automatically tripped by the member 49 arranged in the line of travel of the valve stems in the casing which project thereabove, as indicated in Fig. 7.

In operation, the frame 13 is loaded with containers 1, 2 from the crane 43 as the frames pass beneath the crane, the containers having been provided with assembled sets of sheets 14, 15, 16 (Figs. 7 and 8), as heretofore described. When the frames 13 pass the tank 47, the chambers 5, 5 are each filled with liquid. The frames then pass into the liquid of the tank 37 where a temperature of 250 degrees F. or upward is maintained. The liquid in the chambers 5, 5, and the sheets 14, 15 and 16 are heated by conduction to a temperature of about 250 degrees F., and the expansion of the liquid due to this rise in temperature gives the pressure desired between the sheets, preferably in the neighborhood of 150 pounds per square inch. After leaving the tank 37, the frames 13 are carried through the tank 38 where their temperature and that of their contents is reduced to a point at which the containers and the composite plates therein can be handled conveniently after their removal to the racks. As the containers pass the member 49, the check valves in the casings 26, 26 are released and the containers in each frame removed and carried away by the crane 43, new containers being thereafter supplied to the frames by the crane, thus completing the cycle.

Fig. 9 illustrates a modification in which the chain carrier of the Fig. 1 construction is replaced by a turntable 50 adapted to carry the frames 13, 13, etc. in the vertical positions shown. The frames are preferably arranged so that their slots for receiving the containers open to the side, as this permits the ready insertion of the containers from the trucks 51 which bring the loaded containers to the position shown. After the frames have made the circuit of the table and pressure and heat applied to their contents, they are removed onto the receiving truck 52 and carried to an unloading station. Liquid under pressure is supplied to the chambers of the containers from the tank 53 which is provided with the flexible connection 54. The frames first pass through the heating chamber or tunnel kiln 55 which is heated to any desired temperature by suitable means; such as, gas burners. This chamber is, therefore, the equivalent in function of the heating tank 37 of the Fig. 1 construction. The other side of the turntable is provided with a cooling chamber 56 where a proper temperature is secured by means of water spray pipes or by circulating a large volume of air therethrough by the use of fans or the like.

What I claim is:

1. A process of applying heat and pressure to members to be joined together, which consists in enclosing the members in a container in a body of fluid with the surfaces to be joined in contact, shielding the line of joinder of the members at the periphery thereof against fluid pressure, and heating the container and the fluid therein so as to develop in the confined fluid the pressure necessary to secure a joinder of the members.

2. A process of applying heat and pressure to members to be joined together, which consists in enclosing the members in a container in a body of fluid with the surfaces to be joined in contact, shielding the line of joinder of the members at the periphery thereof against fluid pressure, and passing the container through a heated area so as to develop in the confined fluid the pressure necessary to secure a joinder of the members.

3. A process of applying heat and pressure to members to be joined together, which consists in enclosing the members in a container in a body of fluid with the surfaces to be joined in contact, shielding the line of joinder of the members at the periphery thereof against fluid pressure, passing the container through a heated area so as to develop in the confined fluid the pressure necessary to secure a joinder of the members, and then passing the container through a cooled area to reduce its temperature and that of its contents.

4. A process of applying heat and pressure to members to be joined together, which consists in enclosing the members in a container in a body of fluid with the surfaces to be joined in contact, shielding the line of joinder of the members at the periphery thereof against fluid pressure, heating the container and the fluid therein to develop in the fluid the pressure necessary to secure a joinder of the members, and then cooling the container and its contents.

5. In combination in apparatus for applying heat and pressure to a plurality of members to be joined together comprising a closed metal container for receiving said members, means for applying liquid under pressure to the container so as to fill the space in the container surrounding the members and apply pressure thereto, means for shielding the line of joinder between the members from the application of fluid pressure, a heated area and a cooled area, and means for moving the container through the heated area and then through the cooled area.

6. In combination in apparatus for applying heat and pressure to a plurality of members to be joined together comprising a closed metal container provided with a pair of flexible diaphragms dividing the interior of the container in two parts with a pressure chamber behind each diaphragm, between which diaphragms the members to be joined are adapted to be placed, means for applying liquid under pressure to each chamber, a heated area, and a cooled area, and means for moving the container through the heated area and then through the cooled area.

7. In combination in apparatus for applying heat and pressure to a plurality of members to be joined together, comprising a closed metal container, a body of liquid in the container adapted to receive said members, means for shielding the line of joinder of the members at the periphery thereof against fluid pressure, a heated area and a cooled area, and means for moving the container successively through said areas.

8. In combination in apparatus for applying heat and pressure to a plurality of members to be joined together comprising a rigid frame having a slot opening through one side thereof, a flat container fitting said slot made up of two trays with a flexible diaphragm closing the open side of each between which the members to be joined together are placed, means for supplying liquid to fill the space behind each diaphragm, a heated area and means moving the frame through the heated area.

9. In combination in apparatus for applying heat and pressure to a plurality of members to be joined together comprising a rigid frame having a slot opening through one side thereof, a flat container fitting said slot made up of two trays with a flexible diaphragm closing the open side of each between which the members to be joined together are placed, means for supplying liquid to fill the space behind each diaphragm, a heated area, a cooled area and means moving the frame through the heated area and then through the cooled area.

10. In combination in apparatus for applying heat and pressure to a plurality of members to be joined together comprising a rigid frame of skeleton formation having a slot opening through one side thereof, a flat container fitting said slot made up of two trays with a flexible diaphragm closing the open side of each between which the members to be joined together are placed, means for supplying liquid to fill the space behind each diaphragm, a heated area, and means for moving the frame through the heated area.

In testimony whereof, I have hereunto subscribed my name this 13th day of June, 1928.

VERN K. BOYNTON.